United States Patent [19]
> König et al.

[11] 4,100,339
[45] Jul. 11, 1978

[54] PROCESS FOR PREPARING ACRYLONITRILE/VINYL CHLORIDE COPOLYMERS HAVING AN INCREASED VISCOSITY WHICH COMPRISES USING ANIONIC/NON-IONIC EMULSIFIER BLENDS

[75] Inventors: Joachim König, Schildgen; Carlhans Süling, Odenthal; Günther Boekmke, Leverkusen, all of Germany

[73] Assignee: Bayer Aktiengesellschaft, Leverkusen, Germany

[21] Appl. No.: 765,307

[22] Filed: Feb. 3, 1977

[30] Foreign Application Priority Data

Feb. 6, 1976 [DE] Fed. Rep. of Germany ....... 2604630

[51] Int. Cl.² .................................................. C08F 214/06
[52] U.S. Cl. .............................. 526/193; 260/30.8 DS; 260/32.6 N; 526/209; 526/342
[58] Field of Search ................ 526/193, 342, 209, 225

[56] References Cited

U.S. PATENT DOCUMENTS

| | | | |
|---|---|---|---|
| 2,420,330 | 5/1947 | Shriver et al. | 526/342 |
| 2,420,565 | 5/1947 | Rugeley et al. | 526/342 |
| 3,226,375 | 12/1965 | Greth et al. | 526/209 |
| 3,370,028 | 2/1968 | De Wald | 526/225 |
| 3,370,031 | 2/1968 | Grommers et al. | 526/225 |
| 3,523,111 | 8/1970 | Bibeau et al. | 526/225 |
| 3,595,823 | 7/1971 | Huang | 526/209 |
| 3,759,859 | 9/1973 | Steinwand | 526/225 |

*Primary Examiner*—Harry Wong, Jr.
*Attorney, Agent, or Firm*—Plumley and Tyner

[57] ABSTRACT

The invention relates to a process for the production of chemically uniform copolymers of acrylonitrile and vinyl chloride and, optionally, other copolymerizable ethylenically unsaturated compounds, by the method of emulsion polymerization in the presence of an anion active emulsifier and a non-ionic emulsifier.

7 Claims, No Drawings

PROCESS FOR PREPARING ACRYLONITRILE/VINYL CHLORIDE COPOLYMERS HAVING AN INCREASED VISCOSITY WHICH COMPRISES USING ANIONIC/NON-IONIC EMULSIFIER BLENDS

This invention relates to a process for the preparation of copolymers having an increased viscosity and increased molecular weight comprising of from 20 to 50%, by weight, of acrylonitrile and from 80 to 50%, by weight, of vinyl chloride and, optionally, other copolymerisable compounds.

Copolymers of acrylonitrile and vinyl chloride are suitable for the production of filaments and fibres, the so-called "modacrylic" fibres. Apart from the conventional properties which are advantageous for fibres, modacrylic fibres have a high flame resistance and non-inflammability because of their chlorine content, which renders them eminently suitable for use in the manufacture of wigs, man-made furs, childrens clothing, carpeting, decorative trimmings, curtain material, etc.

It is known to produce acrylonitrile/vinyl chloride polymers by the process of emulsion polymerisation, usually in the presence of a large excess of vinyl chloride. If the two monomers, acrylonitrile and vinyl chloride, are maintained in a certain proportion to each other in a monomer mixture throughout the whole process of polymerisation, the copolymers obtained are chemically uniform, compatible within themselves and usable as fibre material. It is customary to introduce the whole quantity of vinyl chloride at the beginning of polymerisation. The required ratio of monomers is obtained by controlled addition of further quantities of the more rapidly polymerising acrylonitrile by a semi-continuous dosing method.

For the copolymerisation of acrylonitrile and vinyl chloride in aqueous emulsion, the conventional anion active emulsifiers, such as alkyl sulphonates and alkylaryl sulphonates, or fatty alcohol sulphates, e.g. sodium lauryl sulphate, and sulphosuccinic acid esters, e.g. sodium diethyl hexyl sulphosuccinate, may be used in amounts of from 0.7 to 1.5%, based on the total quantity of monomers. Substances which have been used as catalysts for carrying out emulsion polymerisation include: water-soluble initiators, such as peroxodisulphates or hydrogen peroxide, but it is preferred to use redox systems of peroxodisulphate and bisulphite, mercaptan or amine.

Owing to the high activity of vinylchloride as chain transfer agent in the polymerisation reaction, copolymers which have both a high vinyl chloride content and a high molecular weight, as is required for the production of modacrylic fibres having improved properties, may not be obtained in high yield by the known process. If the monomer mixture contains a relatively high proportion of acrylonitrile, the known processes yield copolymers which have both a high acrylonitrile content and a sufficiently high molecular weight. If, however, the monomer mixture has a high vinyl chloride content, as is necessary for the production of copolymers having a high vinyl chloride content, the products produced by the known processes are not suitable for use as raw materials for fibres.

It has now been found that high molecular weight acrylonitrile/vinyl chloride copolymers which are suitable starting materials for the production of modacrylic fibres having improved textile technological properties are obtained if copolymerisation of acrylonitrile and vinyl chloride is carried out in aqueous emulsion in the presence of an anion active emulsifier and, in addition, a non-ionic emulsifier.

Therefore, it is an object of this invention to provide a process for the production of acrylonitrile/vinyl chloride copolymers with improved properties.

It is a further object of this invention to provide a process for the production of such copolymers having increased viscosity and increased molecular weight.

These and other objects which will be evident from the following description and the Examples will be accomplished by a process for the preparation of chemically uniform copolymers having increased viscosity and increased molecular weight, comprising of from 20 to 50%, by weight, of acrylonitrile, from 80 to 50% by weight, of vinyl chloride and, optionally, up to 15%, by weight, of other copolymerisable ethylenically unsaturated compounds, by the method of emulsion polymerisation, which comprises carrying out the polymerisation in the presence of an anion active emulsifier and a non-ionic emulsifier, such that:

(a) the total amount of anion active and non-ionic emulsifier is from 0.75 to 8%, by weight, based on the total quantity of monomer, and (b) the ratio, by weight, of anion active to non-ionic emulsifier is from 10:1 to 1.5:1.

Polymerisation according to the present invention is preferably carried out so that:

(1) the total amount of anion active and non-ionic emulsifier is from 1.5 to 4%, by weight, based on the total quantity of the monomer, and (2) the proportion, by weight, of anion active:non-ionic emulsifier is from 8:1 to 2:1.

The polymerisation process according to the present invention may be carried out semi-continuously. The whole quantity of vinyl chloride is put into the process from the onset of polymerisation and the more rapidly reacting acrylonitrile is continuously replaced at the rate that it is used up. Polymerisation is stopped when the desired polymer content has been reached. The polymerised portion of monomeric vinyl chloride may, of course, also be replaced in the course of polymerisation in order to keep the monomer ratio constant according to the desired composition of the polymer.

If desired, the total quantity of catalyst, activator, acid, anion active emulsifier and non-ionic emulsifier may be introduced into the reaction vessel before polymerisation is begun or, if preferred, the proportion of the components may be added on the course of polymerisation. Furthermore, polymerisation may be carried out continuously if desired.

The acrylonitrile/vinyl chloride copolymers obtained by the process according to the present invention may, in addition, contain up to 15%, by weight, of other copolymerisable ethylenically unsaturated compounds, the amount thereof preferably being from 0.5 to 7%, by weight. Suitable comonomers for this purpose are, for example, vinylidene chloride, vinyl bromide, styrene, vinylpyridene, vinyl esters, such as vinyl acetate, acrylic acid esters, methacrylic acid esters, acrylic acid amide, methacrylic acid amide and mono- and di-alkyl-derivatives of these amides. Ionic additives having acid groups may also be used as copolymerisable compounds for the purpose of improving the dye absorption of the filaments and fibres, e.g. styrene-sulphonic acid, allyl-sulphonic acid, methallylsulphonic acid, 2-acrylamido-2-methylpropane sulphonic acid, acryloxypropylsulphonic acid, methacryloxypropylsulphonic acid and salts of these sulphonic acids.

Water-soluble catalysts are used to initiate polymerisation in the process according to the present invention. Redox catalysts are suitable for obtaining a sufficiently high polymerisation velocity. It is preferred to use redox systems of alkali metal or ammonium peroxodisulphates and compounds of tetravalent sulphur, e.g. alkali metal sulphites, alkali metal hydrogen sulphites, alkali metal disulphites, formaldehyde sulphoxylate or sulphur dioxide. The redox catalysts are preferably used in amounts of from 0.5 to 4%, by weight, based on the total quantity of monomer.

Additional chain transfer agents may be used for producing particular effects, e.g. mercaptans.

Suitable anion active emulsifiers are those which are suitable in an acid medium, e.g. sulphuric acid derivatives, sulphonic acids, phosphoric acids derivatives or phosphonic acids. Very advantageous results are obtained using alkyl sulphonates, preferably having from 10 to 18 carbon atoms in the alkyl chain, alkylaryl sulphonates, preferably having from 8 to 14 carbon atoms in the alkyl chain, fatty alcohol sulphates and sulphosuccinic acid esters. Sodium lauryl sulphate is preferred.

The non-ionic emulsifiers added to the polymerisation reaction mixture in addition to the anion active emulsifiers are polyglycolethers which may be prepared by careful addition of a large number of ethylene oxide or propylene oxide molecules to fatty alcohols, alkyl phenols, aralkyl phenols, fatty acids, resinic acids or fatty acid amides.

The following are preferred individual classes of compounds which may be used:

(1) Fatty alcohol polyglycolethers, i.e. reaction products of ethylene oxide or propylene oxide with fatty alcohols, corresponding to the following general formula:

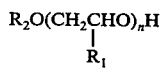

wherein $R_1$ represents hydrogen or methyl; $R_2$ represents a straight- or branched-chain saturated or unsaturated alkyl group having from 8 to 30 carbon atoms; and $n$ represents an integer of from 2 to 30. Examples of the alcohol components of these aducts include: decyl alcohol, lauryl alcohol, cetyl alcohol, stearyl alcohol and oleyl alcohol. The compounds may also contain mixtures of fatty acid alcohols, such as those found, for example, in coconut fatty alcohol.

(2) Alkylaryl polyglycolethers corresponding to the following general formula:

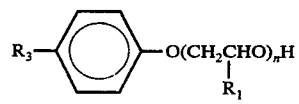

or

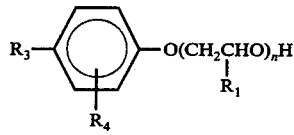

wherein $R_1$ represents hydrogen or methyl; $R_3$ and $R_4$ each represent a straight- or branched-chain alkyl group having from 1 to 20 carbon atoms, an unsubstituted phenyl group or a phenyl group substituted with one or more alkyl groups, or a benzylethyl or phenylethyl group; and $n$ represents an integer of from 2 to 30.

Compounds having the following structural formulae are examples:

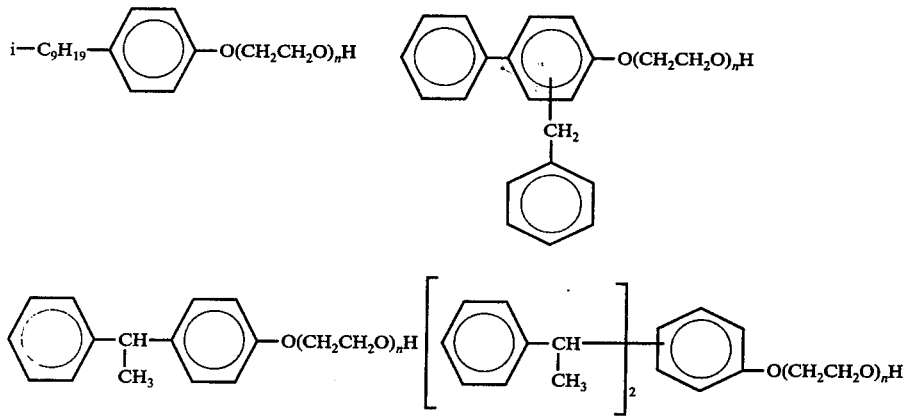

(3) Fatty acid polyglycolether esters corresponding to the following general formula:

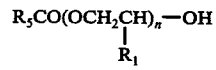

wherein $R_1$ represents hydrogen or methyl; $R_5$ represents a straight- or branched-chain saturated or unsaturated alkyl group having from 6 to 25 carbon atoms; and $n$ represents an integer of from 2 to 30.

Examples include reaction products of ethylene oxide with lauric acid, stearic acid and oleic acid.

(4) Fatty acid amide polyglycol ethers corresponding to the following general formula:

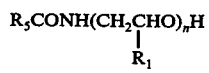

wherein $R_1$ and $R_5$ are as defined above; and $n$ represents an integer of from 2 to 30.

(5) Polyglycolether esters of resinic acids, e.g. reaction products of ethylene oxide with abietic acid.

(6) Polyglycolether esters of castor oil obtained by addition of ethylene oxide to castor oil.

Both the anion active and the non-ionic emulsifier used may be mixtures of various emulsifiers, but the total amount thereof should lie within the range indicated. However, at least one anion active emulsifier and at least one non-ionic emulsifier must be present in the polymerisation system in the proportions indicated. It is surprising that the non-ionic emulsifiers develop their activity only in combination with anion active emulsifiers.

It is advantageous to introduce a latex of acrylonitrile/vinyl chloride copolymer in dilute aqueous emulsion into the polymerisation mixture in order to shorten the induction period of polymerisation.

The process according to the present invention is carried out in a weakly acid emulsion at a pH of from 2 to 6. The emulsion may be adjusted to the required pH by addition of a buffer system, e.g. a phosphate or acetate buffer or by addition of a strong or medium/strong inorganic or organic acid. Suitable acids for this purpose include, e.g. sulphuric acid, nitric acid, phosphoric acid and acetic acid.

It has been found that a suitable temperature range for carrying out the polymerisation is from 10° to 50° C. Temperatures of from 20° to 40° C are particularly advantageous.

The process according to the present invention yields acrylonitrile/vinyl chloride copolymers which have much higher viscosity numbers and hence molecular weights than those obtained by the known processes. Moreover, even polymers which have a comparatively high vinyl choride content have sufficiently high viscosity numbers to ensure good spinning performance.

Another advantage of the process according to the present invention is that it provides a higher polymerisation velocity and hence higher volume/time yields. If it is desired to obtain a copolymer having a particular composition with regard to its acrylonitrile content and vinyl chloride content, the higher polymerisation velocity enables a larger quantity of acrylonitrile to be added within a given period of time so that the desired solids content of latex higher yields of copolymer may be obtained within a shorter time.

The latices obtained by the process according to the present invention are also distinguished by their reduced tendecy to coagulate. By increasing the dosing times and polymerisation times, it is possible to obtain latices having a solids content of up to about 25%, by weight, without the risk of coagulation which would cause the formation of deposits on the walls of the apparatus and blockages and would interfere with isolation of the end product.

The polymers are distinguished by their higher degree of whiteness and greater thermostability and have only a slight tendency to split off hydrogen chloride, even at elevated temperatures. They are soluble, inter alia, in dimethyl formamide, dimethyl acetamide and dimethyl sulphoxide. They may be spun by the known wet-spinning and dry-spinning processes to yield filaments and fibres which have excellent textile properties and good colour tone in the undyed state and also high flame resistance.

The K-values of the polymers given in the following Examples were determined at 25° C in 0.5% dimethyl formamide solution by the method of Fikentscher, Cellulosechemie 13 (1932), p. 58.

The following examples are to further illustrate the invention without limiting it:

EXAMPLE 1 (COMPARISON EXAMPLE)

21,000 parts of deionised water, 150 parts of sodium disulphate, 200 parts of sodium lauryl sulphate, 0.05 parts of iron(II)-ammonium sulphate and 1,200 parts of a latex of acrylonitrile/vinyl chloride copolymer having a solids content of 7% were introduced into a polymerisation autoclave. The oxygen was removed by a stream of nitrogen, 420 parts of acrylonitrile and 7,100 parts of vinyl chloride were forced in under pressure and the temperature was adjusted to 30° C. Polymerisation was started by forcing in, under pressure, a solution of 10.5 parts of ammonium peroxodisulphate and 66.7 parts of N sulphuric acid in 633.3 parts of deionised water. Starting immediately thereafter, 1,400 parts of acrylonitrile and a solution of 21.0 parts of ammonium peroxodisulphate and 133.3 parts of N sulphuric acid in 1,266.7 parts of deionised water were pumped in at a uniform rate over a period of 7 hours. The solids content at the end of 7 hours was 13.0%, by weight. Stirring was continued for a further 15 minutes and the latex obtained was then discharged from the autoclave. After addition of a solution of 50 parts of aluminum sulphate and 300 parts of 68% nitric acid in 3,000 parts of deionised water, the polymer was precipitated by heating to 95° C. 3,500 parts of polymer having the analytical data shown in Table 1 were obtained.

EXAMPLES 2 TO 6

Example 1 was repeated with the addition of 50 parts of the non-ionic emulsifier indicated in Table 1. The results are again shown in Table 1. In each case, it was observed that addition of the non-ionogenic emulsifier resulted in a marked increase in the viscosity ($\eta$) and K-value while the chemical composition of the copolymer changed only slightly.

Table 1

| Example | Anion active emulsifier | | Non-ionogenic emulsifier | Parts | Rate of addition of AN (parts/h) | Total quantity in H$_2$SO$_4$ (parts) | Polymerisation time (in hours) | Final solids content (%, by weight) | Yield (parts) | Cl-content (%) | N-content (%) | Acrylonitrile: Vinyl chloride AN:VC (ratio, by weight) | ($\eta$) (dl/g) | K-value |
|---|---|---|---|---|---|---|---|---|---|---|---|---|---|---|
| | | Parts | | | | | | | | | | | | |
| 1 | 200 parts of sodium lauryl sulphate | — | — | | 200 | 200 | 7 | 13.0 | 3500 | 33.7 | 10.24 | 39.6:60.4 | 0.99 | 67.5 |
| 2 | " | 50 | Coconut fatty alcohol polyethyleneglycol ether (degree of ethoxylation 20) | | 200 | 200 | 7 | 14.0 | 3700 | 33.95 | 9.87 | 38.5:61.5 | 1.41 | 81.0 |
| 3 | " | 50 | Oleylpolyethyleneglycol ether (degree of ethoxylation 19) | | 200 | 200 | 7 | 13.0 | 3480 | 33.4 | 10.0 | 39.2:60.8 | 1.28 | 77.0 |
| 4 | " | 50 | i-nonylphenol-polyethyleneglycol ether (degree of ethoxylation 30) | | 200 | 200 | 7 | 13.0 | 3550 | 33.3 | 9.9 | 39.0:61.0 | 1.27 | 77.0 |
| 5 | " | 50 | Abietic acid polyethyleneglycol ester (degree of ethoxylation 40) | | 200 | 200 | 7 | 14.2 | 3780 | 34.1 | 9.75 | 38.1:61.9 | 1.18 | 74.0 |
| 6 | " | 50 | Oleic acid polyethyleneglycol ester (degree of ethoxylation 6) | | 200 | 200 | 7 | 14.0 | 3730 | 33.4 | 10.28 | 39.8:60.2 | 1.12 | 72.0 |

EXAMPLES 7 TO 8

Example 1 is repeated with the addition in each case of 100 parts of the non-ionogenic emulsifier indicated in Table 2. As may be seen from Table 2, these Examples differ from Example 1 in that not only an increase in the viscosity number and K-value, but also an increase in the polymerisation velocity may be observed, so that after a dosing and polymerisation time of 7 hours an increased solids content and increased copolymer yield are obtained. If the dosing programme for acrylonitrile is the same as that used in Example 1, the copolymers obtained in addition have a higher vinyl chloride content and reduced acrylonitrile content.

EXAMPLE 9 (COMPARISON EXAMPLE)

In order to obtain copolymers having an increased vinyl chloride content as in Example 8 by a conventional process, Example 1 was repeated, but the quantity of N sulphuric acid used was doubled to a total of 400 parts. 133.4 parts of N sulphuric acid were introduced through the starting syringe at the beginning of polymerisation, while the remaining 266.6 parts were pumped in together with ammonium peroxodisulphate in the course of the next 7 hours. At the end of the 7 hours, a solids content of 18%, by weight, was obtained and 5,050 parts of copolymer having the analytical data shown in Table 2 were isolated. The polymer obtained had a higher vinyl chloride content than that of Example 1, but the viscosity number $(\eta)$ = 0.82 dl/g and K-value = 61.5 were too low, so that the polymers had insufficient thermostability, could be spun only with difficulty and gave rise to filaments having inferior textile properties.

EXAMPLE 10

Example 1 was repeated with the addition of 100 parts of i-nonylphenol polyethyleneglycolether (degree of ethoxylation 30) and the rate of addition of acrylonitrile was increased to 250 parts per hour. After a polymerisation time of 7 hours, a solids content of 15.8%, by weight, was obtained and after working-up of the reaction mixture, 4,540 parts of polymer having the analytical data shown in Table 2 were isolated. The yield of polymer obtained was higher than in Example 1, at the same time the product had practically the same chemical composition, but a higher viscosity number and higher K-value.

EXAMPLE 11 (COMPARATIVE EXAMPLE)

Example 1 was repeated, but the anion active emulsifier, sodium lauryl sulphate, was omitted or replaced by 200 parts of non-ionogenic emulsifier, coconut fatty alcohol polyethyleneglycol ether (degree of ethoxylation 20). Acrylonitrile was added at the rate of 250 parts per hour and after a dosing and polymerisation time of 7 hours a solids content of 16.5%, by weight, was obtained. After working-up of the reaction mixture, 4,940 parts of polymer having the analytical data indicated in Table 2 were isolated. Both the viscosity number and K-value were too low and the polymer was unsuitable for spinning. This Example demonstrates that the non-ionogenic emulsifier is not capable on its own of giving rise to a polymer having a sufficiently high viscosity number, but develops its activity only in conjunction with an anion active emulsifier.

EXAMPLE 12

20,000 parts of deionised water, 150 parts of sodium disulphite, 200 parts of sodium lauryl sulphate, 50 parts of the polyethyleneglycol ether of coconut fatty alcohol (degree of ethoxylation 20), 0.1 parts of iron(II)-ammonium sulphate and 1,200 parts of a latex of acrylonitrile/vinyl chloride copolymer having a solids content of 6% by weight were introduced into a polymerisation autoclave. After purging with nitrogen, 400 parts of acrylonitrile and 7,100 parts of vinyl chloride were forced in under pressure and the temperature was adjusted to 30° C. Polymerisation was started by forcing in a solution of 10.5 parts of ammonium peroxodisulphate and 70 parts of N sulphuric acid in 630 parts of deionised water. 3,750 parts of acrylonitrile and a solution of 44.5 parts of ammonium peroxodisulphate and 370 parts of N sulphuric acid in 2,630 parts of deionised water were then pumped in at a uniform rate over a period of 15 hours. At the end of 15 hours, a solids content of 24.5%, by weight, was obtained. The autoclave contents were stirred for a further 15 minutes and the latex obtained was then discharged from the autoclave. After addition of a solution of 50 parts of aluminium sulphate and 300 parts of 68% nitric acid in 3,000 parts of deionised water, the polymer was precipitated by heating to 95° C. 8,900 parts of polymer having the analytical data indicated in Table 2 were obtained after filtration, washing and drying.

Table 2

| Example | Anion active emulsifier | Non-ionogenic emulsifier | | Rate of addition of AN (parts/h) | Total quantity in H$_2$SO$_4$ (parts) | Polymerisation time (in hours) | Final solids content (%, by weight) | Yield (parts) | Cl-content (%) | N-content (%) | AN:VC (ratio, by weight) | ($\eta$) (dl/g) | K-value |
|---|---|---|---|---|---|---|---|---|---|---|---|---|---|
| | | Parts | | | | | | | | | | | |
| 7 | 200 parts of sodium lauryl sulphate | 100 | Coconut fatty alcohol polyethylene-glycol ether (degree of ethoxylation 20) | 200 | 200 | 7 | 19.0 | 6320 | 42.85 | 5.76 | 22.4:77.6 | 1.08 | 71.0 |
| 8 | " | 100 | i-nonylphenol-polyethylene-glycol ether (degree of ethoxylation 30) | 200 | 200 | 7 | 18.0 | 5400 | 37.45 | 8.08 | 31.7:68.3 | 1.06 | 70.0 |
| 9 | " | — | — | 200 | 400 | 7 | 18.0 | 5050 | 36.8 | 8.60 | 33.4:66.6 | 0.82 | 61.5 |
| 10 | " | 100 | i-nonylphenol-polyethylene-glycol ether (degree of ethoxylation 30) | 250 | 200 | 7 | 15.8 | 4540 | 32.9 | 10.0 | 39.5:60.5 | 1.16 | 73.5 |
| 11 | — | 200 | Coconut fatty alcohol polyethylene-glycol ether (degree of ethoxylation 20) | 250 | 200 | 7 | 16.5 | 4940 | 34.2 | 9.05 | 36.3:63.7 | 0.67 | 55.0 |
| 12 | 200 parts of sodium lauryl sulphate | 50 | Coconut fatty alcohol polyethylene-glycol ether (degree of ethoxylation 20) | 250 | 440 | 15 | 24.5 | 8900 | 34.65 | 9.36 | 36.7:63.3 | 1.10 | 71.5 |

EXAMPLE 13

33,500 parts of a latex containing 13%, by weight, of acrylonitrile/vinyl chloride copolymer were prepared in a polymerisation autoclave by a method analogous to that of Example 1, but using as emulsifiers 200 parts of sodium lauryl sulphate and 30 parts of i-nonylphenolpolyethyleneglycol ether having a degree of ethoxylation of 30. Polymerisation was then carried out continuously, the following components being pumped in at a uniform rate per hour at 30° C:

| Solution 1: | Sodium disulphite | 30 | parts |
|---|---|---|---|
| | Sodium lauryl sulphate | 30 | parts |
| | i-nonylphenylpoly-ethyleneglycol ether (degree of ethoxylation 30) | 4.2 | parts |
| | Ferrous ammonium sulphate | 0.01 | parts |
| | Deionised water | 2200 | parts |
| Solution 2: | Ammonium peroxodisulphate | 4.2 | parts |
| | N sulphuric acid | 25 | parts |
| | Deionised water | 2200 | parts |
| Solution 3: | Acrylonitrile | 360 | parts |
| Solution 4: | Vinyl chloride | 1500 | parts |

The contents of the autoclave were maintained at a level corresponding to 33 liters. 6,350 parts of latex were removed and worked-up per hour. The samples of latex removed and the polymers worked-up had the following analytical data:

| Polymerisation time (h) | Solids content (%) | Cl content (%) | N content (%) | $(\eta)$ (dl/g) | K-value |
|---|---|---|---|---|---|
| 12 | 16.5 | 34.6 | 9.8 | 1.04 | 69 |
| 24 | 16.0 | 33.95 | 9.9 | 1.09 | 71 |
| 36 | 15.6 | 33.6 | 10.02 | 1.10 | 71.5 |
| 48 | 16.2 | 34.15 | 9.9 | 1.06 | 70 |
| 60 | 16.0 | 33.95 | 9.88 | 1.09 | 71 |
| 72 | 16.7 | 34.5 | 9.8 | 1.06 | 70 |
| 84 | 16.2 | 34.0 | 9.9 | 1.11 | 72 |

What is claimed is:

1. A process for the preparation of chemically uniform copolymers having increased viscosity and increased molecular weight, comprising of from 20 to 50%, by weight, of acrylonitrile, from 80 to 50%, by weight, of vinyl chloride and, optionally, up to 15%, by weight, of other copolymerisable ethylenically unsaturated compounds, by the method of emulsion polymerisation which comprises carrying out the polymerisation at a pH of from 2 to 6 and a temperature of from 10° to 50° C in the presence of an anion active emulsifier selected from the group consisting of sulphuric acid derivatives, sulphonic acids, phosphoric acid derivatives and phosphonic acids and a non-ionic polyglycol ether emulsifier, such that:
   (a) the total amount of anion active and of non-ionic emulsifier is from 0.75 to 8%, by weight, based on the total quantity of monomer, and
   (b) the ratio, by weight, of anion active to non-ionic emulsifier is from 10:1 to 1.5:1.

2. The process of claim 1, wherein
   (a) the total amount of anion active and on non-ionic emulsifier is from 1.5 to 4%, by weight, based on the total quantity of monomer, and
   (b) the ratio, by weight, of anion active to non-ionic emulsifier is from 8:1 to 2:1.

3. The process of claim 1, wherein said acrylonitrile/vinyl chloride copolymers contain from 0.5 to 7%, by weight, of other copolymerisable ethylenically unsaturated compounds.

4. The process of claim 1, wherein said emulsion polymerisation is carried out in the presence of a redox system of a peroxodisulphate and a compound of tetravalent sulphur.

5. The process of claim 4, wherein the amount of said redox system is from 0.5 to 4%, by weight, based on the total quantity of monomer.

6. The process of claim 1, wherein said anion active emulsifier is sodium lauryl sulphate.

7. The process of claim 1, wherein the polymerisation reaction mixture contains a latex of acrylonitrile/vinyl chloride copolymer.

* * * * *